United States Patent
Grossmann

(10) Patent No.: US 10,336,294 B2
(45) Date of Patent: Jul. 2, 2019

(54) METHOD FOR TRIGGERING ACTIONS IN A VEHICLE AND VEHICLE FOR CARRYING OUT TRIGGERED ACTIONS

(71) Applicant: VOLKSWAGEN AG, Wolfsburg (DE)

(72) Inventor: Markus Grossmann, Gifhorn (DE)

(73) Assignee: Volkswagen AG (DE)

( * ) Notice: Subject to any disclaimer, the term of this patent is extended or adjusted under 35 U.S.C. 154(b) by 83 days.

(21) Appl. No.: 15/591,365

(22) Filed: May 10, 2017

(65) Prior Publication Data

US 2017/0327079 A1 Nov. 16, 2017

(30) Foreign Application Priority Data

May 10, 2016 (DE) .................. 10 2016 207 963

(51) Int. Cl.
| | |
|---|---|
| *B60R 25/01* | (2013.01) |
| *B60R 25/04* | (2013.01) |
| *B60R 25/24* | (2013.01) |
| *H04W 84/00* | (2009.01) |
| *H04W 4/02* | (2018.01) |
| *H04W 4/40* | (2018.01) |

(52) U.S. Cl.
CPC .............. *B60R 25/01* (2013.01); *B60R 25/04* (2013.01); *B60R 25/24* (2013.01); *B60R 25/245* (2013.01); *H04W 4/023* (2013.01); *H04W 4/40* (2018.02); *B60R 2325/105* (2013.01); *H04W 84/005* (2013.01)

(58) Field of Classification Search
CPC ......... B60R 25/01; B60R 25/04; B60R 25/24; B60R 25/245; B60R 2325/105; H04W 4/40; H04W 4/023; H04W 84/005
See application file for complete search history.

(56) References Cited

U.S. PATENT DOCUMENTS

| | | | | |
|---|---|---|---|---|
| 8,159,324 | B2 * | 4/2012 | Zellweger | G07C 9/00309 340/12.28 |
| 9,666,005 | B2 * | 5/2017 | Ellis | G07C 9/00309 |
| 9,666,040 | B2 * | 5/2017 | Flaherty | G08B 6/00 |
| 9,745,778 | B1 * | 8/2017 | Bingle | E05B 81/78 |
| 2001/0052839 | A1 * | 12/2001 | Nahata | E05B 81/78 340/5.72 |
| 2002/0107010 | A1 * | 8/2002 | Witte | B60R 25/2081 455/418 |
| 2005/0030151 | A1 * | 2/2005 | Singh | B60R 25/1004 340/5.8 |

(Continued)

FOREIGN PATENT DOCUMENTS

| | | |
|---|---|---|
| CN | 102689620 A | 9/2012 |
| CN | 103670121 A | 3/2014 |

(Continued)

OTHER PUBLICATIONS

Search Report for Chinese Patent Application No. 201710325507.8; dated Nov. 26, 2018.

*Primary Examiner* — Mussa A Shaawat

(74) *Attorney, Agent, or Firm* — Barnes & Thornburg LLP

(57) ABSTRACT

A method for triggering an action of a vehicle including changing a position of a device relative to the vehicle, detecting the change in the position of the device, and triggering a configurable action in the vehicle based on the detected change in the position of the device.

18 Claims, 2 Drawing Sheets

(56) References Cited

U.S. PATENT DOCUMENTS

| | | | |
|---|---|---|---|
| 2006/0232378 A1* | 10/2006 | Ogino | B60R 25/246 340/5.62 |
| 2007/0247282 A1 | 10/2007 | Olsen et al. | |
| 2012/0271486 A1 | 10/2012 | McDonald, II et al. | |
| 2013/0211623 A1* | 8/2013 | Thompson | G07C 5/008 701/2 |
| 2014/0230329 A1* | 8/2014 | Patel | E05B 83/36 49/25 |
| 2015/0235486 A1* | 8/2015 | Ellis | G07C 9/00309 340/5.61 |
| 2017/0342750 A1* | 11/2017 | Hiramine | G07C 9/00309 |

FOREIGN PATENT DOCUMENTS

| | | |
|---|---|---|
| CN | 104709230 A | 6/2015 |
| DE | 4123654 A1 | 1/1993 |
| DE | 4226053 A1 | 2/1993 |
| DE | 19826904 A1 | 12/1999 |
| DE | 19900415 A1 | 7/2000 |
| DE | 19956285 A1 | 5/2001 |
| DE | 10341286 A1 | 4/2005 |
| DE | 102004059179 A1 | 7/2006 |
| DE | 102008064034 A1 | 6/2010 |
| DE | 102012016783 A1 | 3/2013 |
| DE | 102012222175 A1 | 6/2014 |
| DE | 102014119401 A1 | 6/2016 |

* cited by examiner

METHOD FOR TRIGGERING ACTIONS IN A VEHICLE AND VEHICLE FOR CARRYING OUT TRIGGERED ACTIONS

PRIORITY CLAIM

This patent application claims priority to German Patent Application No. 10 2016 207 963.8, filed 10 May 2016, the disclosure of which is incorporated herein by reference in its entirety.

SUMMARY

Illustrative embodiments relate to a method for triggering an action of a vehicle, for instance, a commercial vehicle, and also relate to a vehicle which is designed to trigger and/or perform an action of the vehicle according to the disclosed method.

BRIEF DESCRIPTION OF THE DRAWINGS

Below, the disclosed embodiments are explained in more detail, with reference being made to the figures. In detail.

DETAILED DESCRIPTION

Figure 1:
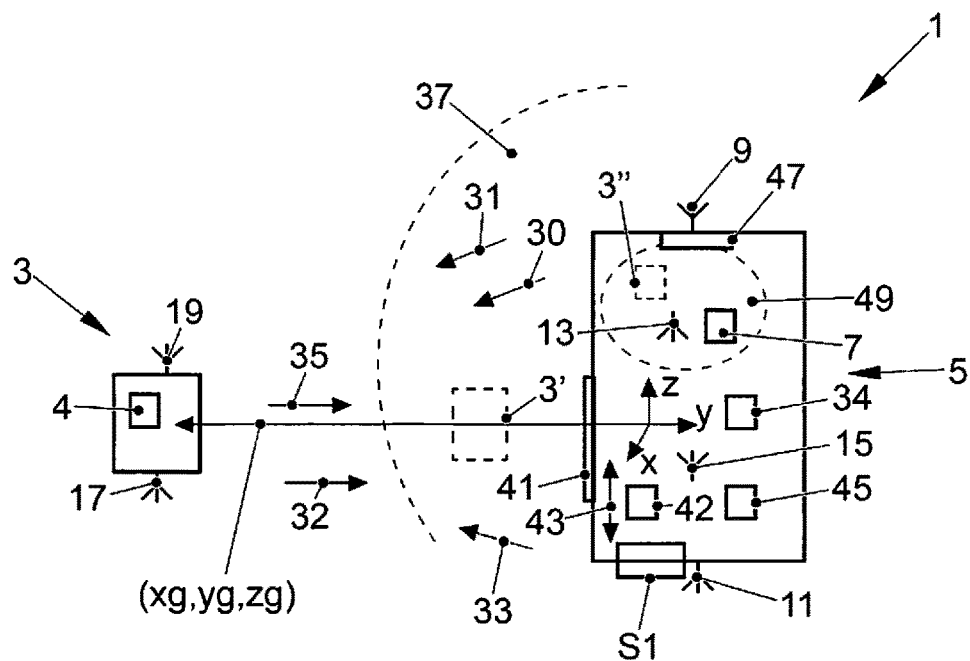
FIG. 1 schematically illustrates a system for triggering an action of a vehicle according to at least one disclosed embodiment.

DE 41 23 654 A1 discloses a method for detecting a portable transponder for keyless entry to the vehicle, which transponder is enclosed in the vehicle interior, the position of the transponder being detected and a signal being triggered, the locking being carried out only when the transponder is detected as being outside the vehicle. Information relating to the position of the transponder is obtained from the field strength profile of the transponder. In addition to determining the position of the transponder, a movement trend of the transponder can also be detected from the field strength changes and from the field strength change profile of code signals which are emitted in succession by the transponder.

DE 199 00 415 B4 discloses a method for carrying out keyless access authorization control for motor vehicles, a transmitting/receiving device and also an identification encoder being provided in the motor vehicle. The instantaneous position of the identification encoder is determined, to be precise by means of the identification encoder itself. A plausibility check with respect to the action signal received by the identification encoder is also carried out on the basis of its previously determined position. To open the vehicle, the person carrying the identification encoder actuates the door handle of the driver's door, whereupon a changeover switch supplies the unlocking request to the transmitting/receiving device, whereupon the latter reacts with the start of a question/answer dialog. In this case, low-frequency transmitters are used to transmit wake-up signals for waking up identification encoders in the receiving range of these low-frequency transmitters. Location-coded low-frequency signals are then transmitted by the low-frequency transmitters. The position of the identification encoders in the receiving range of the low-frequency transmitters is also determined.

Conventional methods for keyless access to a vehicle have drawbacks when handling a vehicle in some situations.

Disclosed embodiments provide a method for triggering (and/or performing) an action of a vehicle and to provide a vehicle, in which case handling of the vehicle is simplified.

At least one disclosed embodiment provides a method for triggering (and/or performing) an action of a vehicle, for instance, a commercial vehicle, for instance, a truck. In this case, the method comprises changing a position of a device (for instance, comprising an electronic key, for example, having a smartphone, an RFID chip etc.) relative to the vehicle. For example, an authorized owner or driver of the vehicle can carry the device and can move relative to the vehicle, for instance, on foot, to either move toward the vehicle or move away from the vehicle. The method also comprises detecting the change in the position of the device (for example, in the case of the vehicle or in the case of the device). For this purpose, one or more radio signals may be interchanged between the vehicle and the device and signal identities or field strengths can be recorded in the device and/or the vehicle on the basis of the time. The method also comprises triggering (and/or performing) a configurable action in the vehicle on the basis of the detected change in the position of the device. The action may comprise, for example, activating or deactivating a drive motor or a servo motor for opening or closing vehicle doors or vehicle flaps or a servo motor for locking or unlocking one or more locks.

Disclosed embodiments can be used for the commercial vehicle sector. On account of an action which is triggered without user interaction, the handling of a commercial vehicle can be simplified. A driver's door and/or a loading compartment door can be automatically opened or closed as an action. Furthermore, a motor can be automatically started or stopped. The configurable action can be carried out in the presence of particular logical criteria relating to the position and/or movement of the device relative to the vehicle. As a result, it is possible to optimize delivery times by means of configurable automated door/flap drives triggered by approaching or leaving a vehicle or in combination with automated starting or stopping of the motor.

Disclosed embodiments enable the situation in which an authorized driver of a vehicle, for instance, a driver of a commercial vehicle, no longer has to carry out any actions with the vehicle key to cause the vehicle to stop the motor, lock the vehicle, unlock and open the loading compartment, close and lock the loading compartment, unlock the driver's cab and start the motor. Gesture control, a virtual pedal, an easy-open-close concept, for example, can be used to select the triggered action.

For example, it is possible to handle the vehicle, such that both hands can remain free, which may therefore also be possible when carrying loads. The action can be triggered by approaching or moving away from the vehicle or a particular section inside the vehicle. To detect the change in the position of the device, positions of the device relative to the vehicle can be determined at different times and can then be compared to determine a direction of movement and optionally also a speed of movement of the device relative to the vehicle.

For example, at a first time, the vehicle can emit radio signals each with a known signal strength from a plurality of antennas arranged at different locations. If the device is in a range of the radio signals, the device can receive the different radio signals and can determine their signal strengths upon reception. On account of a known dependence of the signal strength on a distance to the emitting antenna, the distance between the device and the respective antenna of the vehicle can be inferred from the signal strength of the emitted signal and the signal strength of the received signal. If a plurality of distances between the device and various antennas are determined in this manner with the aid of signals emitted by a plurality of antennas, the (three-dimensional) position of the device relative to the vehicle can be finally determined at a particular time. If a relative position is determined for at least one further time (or a plurality of further times), a state of movement of the device relative to the vehicle can be inferred.

The radio signals can be emitted, for example, in the low-frequency range (LF), in the high-frequency range (HF) and/or in the ultra-high-frequency range (UHF), for example, in frequency ranges which are compatible with conventional keyless entry systems and methods. The vehicle may comprise a logic/arithmetic control unit which can determine the position of the device and/or can detect the change in the position of the device. The control unit may also comprise an electronic memory or at least access to an electronic memory may be enabled, which makes it possible to store one (or more) configurable action(s) for one or more conditions (for example, the device moves toward the vehicle or the device moves away from the vehicle). The control device may also comprise an electronic circuit to generate, for the configurable action, control signals for one or more actuators which are installed in the vehicle and are designed to perform the action. The control signals may be supplied, for example, to an electric motor which can lock, unlock, close or open doors and/or flaps of the vehicle, for example. In other embodiments, the motor may also comprise a drive motor of the vehicle.

The method can be carried out, for example, by an apparatus inside a vehicle and a mobile device, for instance, a mobile electronic key. Disclosed embodiments may improve keyless access to a vehicle (keyless entry). For example, if an authorized driver's hand approaches a door handle of a vehicle equipped with a keyless entry system up to a particular distance, the corresponding system can be woken up from a sleep mode. Furthermore, a coded query signal may be emitted at a low frequency of 125 or 130 kHz, for example, using one or more antennas distributed on or in the vehicle. The system can then change over to a receiving mode in the UHF range (for example, 433 MHz or 868 MHz for Europe or 315 MHz for Japan and the USA) and can wait for a confirmation. If the device, for example, the electronic key which may be an RFID transponder, is in a range (of a few meters), it receives the low-frequency query signal, can decode it and can emit it again with new coding in the UHF frequency band. This signal emitted by the electronic key can be decoded again in the vehicle. In this case, the system inside the vehicle can respectively know both the coding table of the electronic key and its own coding table and can therefore compare its own original emission with the signal just received. If there is no correct response within a defined time, the system can switch to a waiting mode again. If both codes match, this can effect authentication, as a result of which the system can release the lock of the vehicle and/or can trigger a configurable action.

Disclosed embodiments may make it possible to access, restart, lock and secure, automatically unlock and possibly electrically move the sliding door and the tailgate door or trunk lid by virtue of the device approaching or moving away from the vehicle. This makes it possible to achieve a maximum time saving, for example, during a delivery journey.

The method may also comprise configuring the action by selecting one or more preset actions. For example, in a cockpit of the vehicle, an action can be selected, if there is a particular configuration of the device relative to the vehicle, using a touchscreen, a voice input or any desired other input. For example, it is possible to configure which of a plurality of doors or flaps of the vehicle are intended to be unlocked, locked, opened or closed if there is a particular condition with respect to the relative position or relative movement of the device relative to the vehicle. The possibility of configuring the action makes it possible to further simplify the handling of the vehicle. Furthermore, the actions can be tailored to individual needs of a user.

If a threshold period of time has elapsed since the device approached the device, the triggering of the configurable action can be prevented if the device approaches the vehicle again.

The action may comprise changing an operating state of a drive motor and/or of a motor for moving and/or locking a passenger access door and/or a loading compartment access door and/or a tailgate of the vehicle. Important actions can therefore be supported to simplify handling of the vehicle, for instance, during delivery.

The detection of the change in the position of the device may comprise in this case detecting whether there was an approach of the device to a monitoring region of the vehicle or inside the monitoring region or a moving away of the device from the monitoring region or inside the monitoring region, the triggering of the configurable action in the vehicle comprising triggering a specific action of a plurality of configurable actions, the specific action being selected from the plurality of configurable actions depending on whether the detection indicates an approach of the device to or inside or a moving away of the device from or inside the monitoring region of the vehicle.

The monitoring region may comprise a plurality of partial monitoring regions inside and/or outside the vehicle. According to the method, it is possible to determine in which of the plurality of partial monitoring regions the device is situated. Depending on the partial monitoring region in which the device is situated or the partial monitoring region entered by the device or the partial monitoring region left by the device, different configurable actions can be triggered. Furthermore, it is possible to respectively determine for each of the partial monitoring regions whether the device (situated inside this respective partial monitoring region) approaches the vehicle or moves away from the vehicle. A movement pattern of the key relative to the vehicle can therefore be reliably determined and, on the basis of the specific movement pattern determined, a configurable action matched thereto can be performed.

The monitoring region may comprise an interior monitoring region of an interior of a vehicle and an exterior monitoring region of an exterior of the vehicle. If it is determined, for example, that the device is situated inside the interior monitoring region, only particular actions compatible with this can be performed and actions which are not compatible with this situation, for example, opening of a loading compartment access door or a loading compartment access flap, can be prevented. If it is determined, for example, that the device is situated in the exterior monitoring region, starting of a drive motor may be prevented, for example.

The interior monitoring region may comprise a driver's seat monitoring region or else a passenger seat monitoring region, and the exterior monitoring region may comprise a driver's door monitoring region and a loading compartment door monitoring region for each loading compartment opening. Typical position patterns and movement patterns of a device relative to the vehicle, for example, during a delivery process, can therefore be supported.

If the detection indicates a moving away of the device from the driver's seat monitoring region or inside the driver's seat monitoring region, the specific action may comprise stopping a drive motor.

If the detection indicates a moving away of the device from the driver's door monitoring region or inside the driver's door monitoring region and if the driver's door is also detected as being closed, the specific action may comprise centrally locking all doors and flaps of the vehicle.

If the detection indicates a moving away of the device from the exterior monitoring region or inside the exterior monitoring region, for example, from the loading compartment door monitoring region, the specific action may comprise closing and locking a loading compartment door or a loading compartment flap.

If the detection indicates an approach of the device to the exterior monitoring region or inside the exterior monitoring region, for instance, to the loading compartment door monitoring region, the specific action may comprise unlocking and opening a loading compartment door or a loading compartment flap.

If the detection indicates an approach of the device to the driver's door monitoring region or inside the driver's door monitoring region and/or if a driver's door handle sensor is actuated, the specific action may comprise unlocking a central locking system and/or closing a loading compartment door or a loading compartment flap.

If the detection indicates an approach of the device to the driver's seat monitoring region or inside the driver's seat monitoring region, the specific action may comprise starting a drive motor.

The following actions can be performed by way of example:

A keyless stop can be carried out, for example, which may comprise a logical motor stop (start/stop conditions satisfied or leaving of the driver's seat).

A driver's cab keyless close can therefore also be carried out, in which case a central locking system independently locks in the case of a closed driver's cab when the radio capture range of the front door is left.

A loading compartment keyless open can also be carried out, in which case a central locking system unlocks only the loading compartment and starts the opening of the electrical sliding door or tailgate upon entering the associated radio capture range.

A loading compartment keyless close can also be carried out thereby, in which case a central locking system locks and starts the closing of the electrical sliding door or tailgate upon leaving the associated radio capture range.

A driver's cab keyless open can also be carried out in this manner, in which case the central locking system is unlocked by means of a door handle sensor (intervention). If an automatic opening run of the sliding door or tailgate was started in this case, it can be reversed and the doors and flaps can be closed.

A driver's cab keyless start can also be carried out thereby, which may comprise a logical motor start. If all start conditions are satisfied (shift lever is at P or N, interlock, brake actuated, driver's seat occupation active, etc.), the drive motor starts independently.

A check can be carried out, before opening or closing a loading compartment door or a loading compartment flap, to determine whether a space required for this is free. If the space is not free, the closing or opening operation can be prevented. This makes it possible to improve safety when handling the vehicle.

It should be understood that features which have been described, explained or provided individually or in any combination in connection with a method for triggering an action of a vehicle may likewise be applied individually or in any combination to a vehicle according to disclosed embodiments.

At least one disclosed embodiment provides a vehicle which is designed to trigger an action. The vehicle has a receiving and transmitting antenna system for emitting radio signals to a device and for receiving the signals from the device. The vehicle is designed, if a change in the position of the device relative to the vehicle is detected, to perform a configurable action in the vehicle on the basis of the detected change in the position of the device. The vehicle, together with the device, i.e., an electronic key, is designed to carry out a method for triggering an action of a vehicle according to at least one disclosed embodiment.

A system for triggering an action of a vehicle is also provided, which system has the vehicle and a device, likewise with a receiving and transmitting antenna system.

The vehicle may have at least one interior antenna or two interior antennas, and at least one exterior antenna or two exterior antennas. The device may have, for example, a 3D receiving antenna which may have three antenna sections which are oriented in different directions, which in pairs enclose an angle of 90°, for example. The device may also comprise a transmitting antenna. The operation of determining the position and/or determining the change in the position of the device relative to the vehicle may comprise one or more field strength measurements in the vehicle and/or the device.

The system 1 for triggering an action of a vehicle, as schematically illustrated in FIG. 1, has a device 3 having a receiving and transmitting antenna system 4 and a vehicle 5 which comprises a receiving and transmitting antenna system 7. In this case, the receiving and transmitting antenna system 7 has at least two external antennas 9 and 11 and two internal antennas 13 and 15 which are designed to emit and receive radio signals in the LF, HF or UHF frequency range.

The device 3 may comprise an electronic key or may be integrated in the latter, for example, or may be integrated in a smartphone, for example, or may embody a smartphone. The device has an antenna 17 for receiving radio signals, which antenna may be a 3D antenna, for example. The device also comprises a transmitting antenna 19 which may be optionally integrated with the receiving antenna 17.

If a change in the position (xg, yg, zg) of the device 3, which may be defined with respect to a coordinate system xyz of the vehicle 5, is detected, the vehicle 5 is designed to perform a configurable action in the vehicle 5 on the basis of the detected change in the position of the device 3. In this respect, the vehicle 5, together with the device 3, carries out a method for triggering an action of a vehicle according to at least one disclosed embodiment, which is schematically illustrated as a flowchart 25 in FIG. 2. In a method operation at 27, the position of the device 5 relative to the vehicle 5 is changed, for instance, as a result of movement of an authorized driver carrying the device 3. In a further method operation at 29, the change in the position of the device is detected.

The detection of the position and/or the detection of the change in the position of the device 3 may in this case comprise, for example, the emission of two (or even more) radio signals 31 and 33 from the various external antennas 9 and 11 of the vehicle. In this case, the radio signals 31 and 33 are emitted with known signal strengths. The device 3 receives the two radio signals 31 and 33 by means of the receiving antenna 17, and determines the signal strengths of the received radio signals. The respective distance between the transmitting antenna and the device can be inferred from the original signal intensity and the received signal intensity. The position of the device 3 can therefore be determined on the basis of a plurality of distance measurements. If positions of the device 3 are determined in the same manner or in a similar manner at different times, a movement of the device 3 or a change in the position of the device 3 can be inferred. In the example illustrated, it is determined, for example, that the device 3 is moving toward the vehicle 5 according to the movement vector 35 (which can also be interpreted as a speed of the device 3). The position of the device 3 at a later time is illustrated by means of the dashed illustration with reference numeral 3'. At this later time, the device 3' is situated inside an exterior monitoring region 37.

Figure 2:
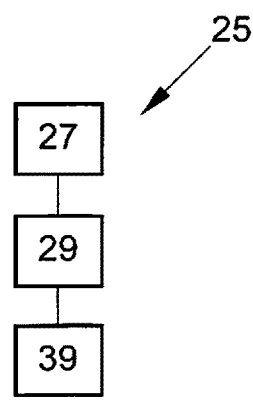
FIG. 2 illustrates a flowchart of a method for triggering an action of a vehicle according to at least one disclosed embodiment.

On the basis of this positioning or the change in the position of the device 3 inside the exterior monitoring region 37, an action is triggered in the vehicle 5 according to a further method operation at 39 of the method 25 illustrated in FIG. 2. That action may comprise, for example, opening a sliding door 41, that is to say moving it along the directions 43. Opening the sliding door 41, in a manner driven by an electric motor 42, grants access to a loading compartment inside the vehicle 5.

If the device 3 is situated inside the vehicle 5 at an even later time, as indicated by reference numeral 3", a further action can also be triggered, for instance, automatic starting of a drive motor 45 of the vehicle 5.

By means of a configuration device 47, an owner of the vehicle 5 is enabled to configure triggering of different actions for different configurations of the device 3 relative to the vehicle. A condition under which the motor 45 is automatically started, for example, may comprise checking whether the device 3 is situated inside an interior monitoring region 49. Automatic starting may also be limited, for example, to the condition being satisfied whereby the device 3 is close to a driver's seat. Other criteria are possible. The configuration device 47 may make it possible to set whether actions are intended to be automatically performed if a particular configuration or a particular movement pattern of the device relative to the vehicle 5 is detected. For example, the configuration device 47 may make it possible to configure which sliding door is intended to be automatically opened or closed if there are a plurality of sliding doors or flaps for accessing the loading compartment in the vehicle 5. An action may also comprise automatically opening or closing a tailgate 51. The configuration apparatus 47 may also make it possible to set whether an automated motor start/stop is intended to be performed if particular conditions are satisfied.

Figure 3:
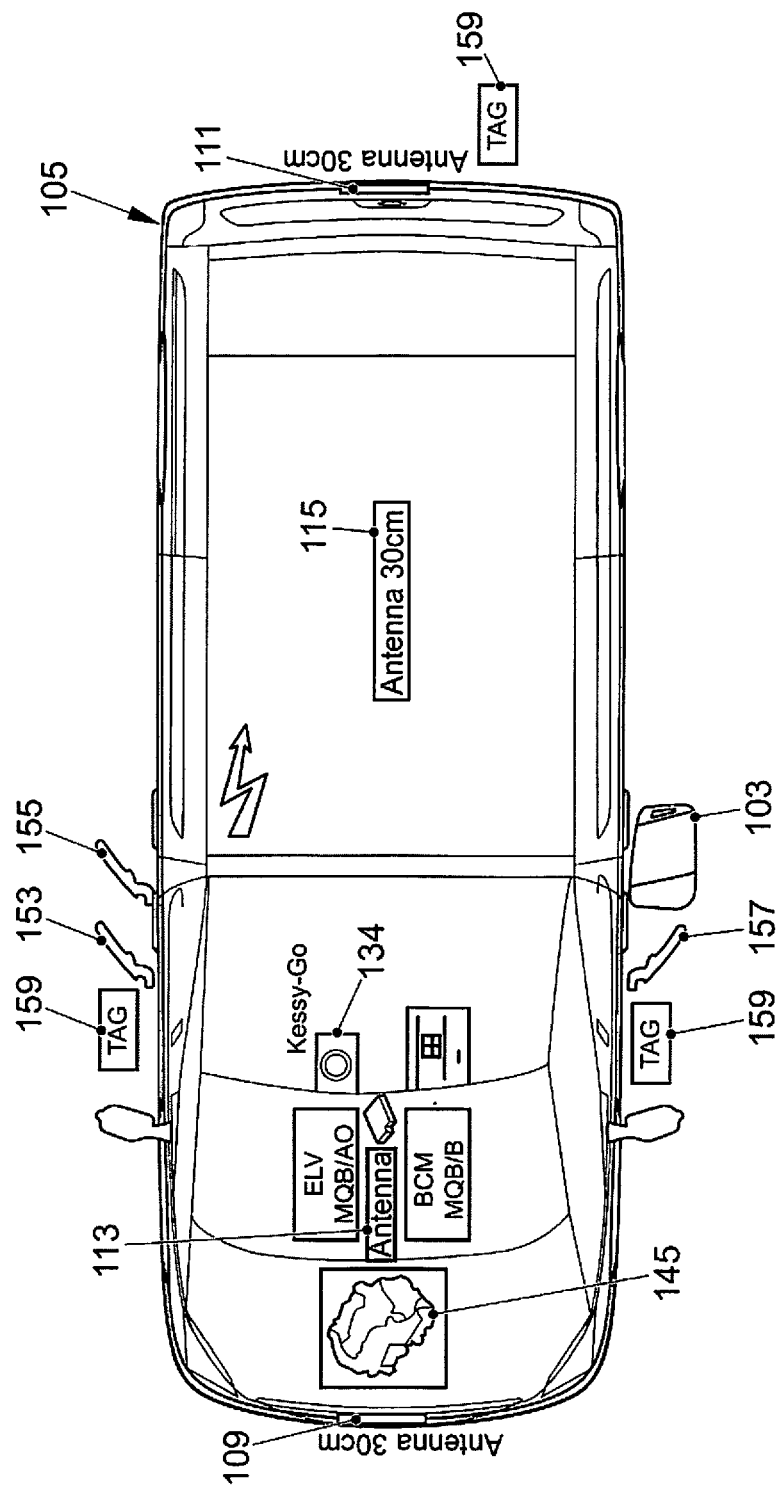
FIG. 3 schematically illustrates a vehicle according to at least one disclosed embodiment.

FIG. 3 schematically illustrates a vehicle 105 according to at least one disclosed embodiment. Elements which have an identical or similar structure and/or function are denoted in FIGS. 1 and 3 using reference symbols which differ only in the first numeral. The vehicle 105 illustrated in FIG. 3 has a front external antenna 109, a rear external antenna 111, a first internal antenna 115 and a second internal antenna 113. The vehicle 105 also has a motor 145 which can be automatically stopped or started according to at least one disclosed embodiment if particular configurations are assumed between a device 103 and the vehicle 105 or the device 103 exhibits a particular state of movement or a particular movement pattern. Side doors 153, 155 and 157 of the vehicle 105 are equipped with tags 159 and a region at the end of the vehicle is also equipped with a tag 159. These tags may capacitively detect the proximity of the device 103, for example, and can then start a method according to at least one disclosed embodiment, for instance, method 25.

If the device 3 is situated within a predetermined perimeter 37 around the vehicle 5, the vehicle may emit a coded query signal 30, for example, at a low frequency, to authenticate/identify the device 3. The vehicle 5 or the transmitting/receiving system 7 can then change over to a receiving mode, for example, in the UHF range (for example, 433 MHz in Europe or 868 MHz or 315 MHz in Japan or in the USA), and can wait for a confirmation from the device 3. If the device 3 (which may be an RFID transponder) is situated inside a region 37 which may constitute an acceptable environment of the vehicle 5, the device 3 receives the coded signal 30 from the vehicle 5. The device 3 can then decode the signal 30 and can emit it again with new coding as a signal 32 (for example, in the UHF frequency range). The vehicle 5 receives the signal 32 emitted by the device 3 and decodes it. Since the keyless go control device 34, 134 which is included in the vehicle 5 knows both coding tables, it can compare its own original emission with the signal 32 just received. If there is no response within a defined time, the system 1 can change over to a standby mode again. If the decoded signal 32 emitted by the device 3 matches the signal 30 emitted by the vehicle 5, the device 3 can be detected as being authorized. The method 25 illustrated in FIG. 2, for example, can then be carried out.

LIST OF REFERENCE SYMBOLS

1 System
3 Device
5 Vehicle
7 Transmitting and receiving system
4 Transmitting and receiving system
9, 11 External antennas
13, 15 Internal antennas
17 Receiving antennas
19 Transmitting antennas
25 Method
27, 29, 39 Method operations
31, 33 Radio signals
34, 134 Keyless-go control device
35 State of movement of the device
xg, yg, zg Position of the device
3' Position of the device at a later time
3" Position of the device at an even later time
41 Sliding door
43 Movement direction of the sliding door
45 Drive motor
47 Configuration device
49 Interior monitoring region
37 Exterior monitoring region
153, 155, 157, 159 Tags

The invention claimed is:
1. A method for triggering configurable action of a transportation vehicle, the method comprising:

detecting a changing of position of a user device relative to the transportation vehicle;

detecting the change in the position of the user device;

triggering a configurable action in the transportation vehicle based on the detected change in the position of the user device, wherein, in response to the detection of the change in the position of the user device indicating movement away of the user device from an exterior monitoring region or movement inside the exterior monitoring region, automatic triggering of the configurable action is performed, wherein the configurable action comprises closing a loading compartment door or a loading compartment flap of the transportation vehicle.

2. The method of claim 1, further comprising configuring the configurable action by selecting one or more preset actions of the transportation vehicle.

3. The method of claim 1, wherein the configurable action comprises changing an operating state of a drive motor and/or of a motor for moving and/or locking a passenger access door and/or a loading compartment access door and/or a tailgate of the transportation vehicle.

4. The method of claim 1, wherein the movement detection comprises detecting whether there was an approach of the user device to a monitoring region of the transportation vehicle or movement inside the monitoring region or a movement away of the user device from the monitoring region or movement inside the monitoring region, wherein the triggering of the configurable action in the transportation vehicle comprises triggering a specific action of a plurality of configurable actions including the configurable action, the specific action being selected from the plurality of configurable actions depending on whether the movement detection indicates an approach of the user device to or inside or a movement away of the user device from or inside the monitoring region of the transportation vehicle.

5. The method of claim 1, wherein the monitoring region comprises an interior monitoring region of an interior of the transportation vehicle and an exterior monitoring region of an exterior of the transportation vehicle.

6. The method of claim 5, wherein the interior monitoring region comprises a driver's seat monitoring region, and the exterior monitoring region comprises a driver's door monitoring region and a loading compartment door monitoring region.

7. The method of claim 6, wherein, in response to the movement detection indicating a movement away of the user device from the driver's seat monitoring region or movement inside the driver's seat monitoring region, the configurable action comprises stopping a drive motor, and/or wherein, in response to the movement detection indicating movement away of the user device from the driver's door monitoring region or movement inside the driver's door monitoring region and the driver's door also being detected as being closed, the configurable action further comprises centrally locking all doors and flaps of the transportation vehicle, and/or wherein, in response to the movement detection indicating movement away of the user device from the loading compartment door monitoring region, the configurable action further comprises closing and locking the loading compartment door or the loading compartment flap of the transportation vehicle.

8. The method of claim 6, wherein, in response to the movement detection indicating an approach of the user device to the exterior monitoring region or movement inside the exterior monitoring region, the configurable action further comprises unlocking and opening a loading compartment door or a loading compartment flap of the transportation vehicle, and/or wherein, in response to the movement detection indicating an approach of the user device to the driver's door monitoring region or movement inside the driver's door monitoring region and/or in response to a driver's door handle sensor being actuated, the configurable action further comprises unlocking a central locking system of the transportation vehicle and/or closing a loading compartment door or a loading compartment flap of the transportation vehicle, and/or wherein, in response to the movement detection indicating an approach of the user device to the driver's seat monitoring region or movement inside the driver's seat monitoring region, the configurable action further comprises starting a drive motor of the transportation vehicle.

9. The method of claim 1, further comprising performing a check, before triggering automatic opening or closing the loading compartment door or the loading compartment flap of the transportation vehicle to determine whether a space required for opening or closing is free.

10. A transportation vehicle comprising:

a receiving and transmitting antenna system for emitting radio signals to a user device and for receiving the signals from the user device;

a logic/arithmetic control unit configured to, in response to a detected change in position of the user device relative to the transportation vehicle, perform automatic triggering of a configurable action in the transportation vehicle based on the detected change in the position of the user device, wherein, in response to the detection of the change in the position of the user device indicating movement away of the user device from an exterior monitoring region or movement inside the exterior monitoring region, the configurable action comprises closing a loading compartment door or a loading compartment flap of the transportation vehicle.

11. The transportation vehicle of claim 10, wherein the configurable action is configured by selection of one or more preset actions of the transportation vehicle.

12. The transportation vehicle of claim 10, wherein the configurable action comprises changing an operating state of a drive motor and/or of a motor for moving and/or locking a passenger access door and/or a loading compartment access door and/or a tailgate of the transportation vehicle.

13. The transportation vehicle of claim 10, wherein the movement detection comprises detecting whether there was an approach of the user device to a monitoring region of the transportation vehicle or movement inside the monitoring region or a movement away of the user device from the monitoring region or movement inside the monitoring region, wherein the triggering of the configurable action in the transportation vehicle comprises triggering a specific action of a plurality of configurable actions including the configurable action, the specific action being selected from the plurality of configurable actions depending on whether the movement detection indicates an approach of the user device to or inside or a movement away of the user device from or inside the monitoring region of the transportation vehicle.

14. The transportation vehicle of claim 10, wherein the monitoring region comprises an interior monitoring region of an interior of the transportation vehicle and an exterior monitoring region of an exterior of the transportation vehicle.

15. The transportation vehicle of claim 14, wherein the interior monitoring region comprises a driver's seat monitoring region, and the exterior monitoring region comprises a driver's door monitoring region and a loading compartment door monitoring region.

16. The transportation vehicle of claim 15,
wherein, in response to the movement detection indicating a movement away of the user device from the driver's seat monitoring region or movement inside the driver's seat monitoring region, the configurable action comprises stopping a drive motor, and/or
wherein, in response to the movement detection indicating movement away of the user device from the driver's door monitoring region or movement inside the driver's door monitoring region and the driver's door also being detected as being closed, the configurable action further comprises centrally locking all doors and flaps of the transportation vehicle, and/or
wherein, in response to the movement detection indicating movement away of the user device from the loading compartment door monitoring region, the configurable action further comprises closing and locking the loading compartment door or the loading compartment flap of the transportation vehicle.

17. The transportation vehicle of claim 15, wherein, in response to the movement detection indicating an approach of the user device to the exterior monitoring region or movement inside the exterior monitoring region, the configurable action further comprises unlocking and opening a loading compartment door or a loading compartment flap of the transportation vehicle, and/or
wherein, in response to the movement detection indicating an approach of the user device to the driver's door monitoring region or movement inside the driver's door monitoring region and/or in response to a driver's door handle sensor being actuated, the configurable action further comprises unlocking a central locking system of the transportation vehicle and/or closing a loading compartment door or a loading compartment flap of the transportation vehicle, and/or
wherein, in response to the movement detection indicating an approach of the user device to the driver's seat monitoring region or movement inside the driver's seat monitoring region, the configurable action further comprises starting a drive motor of the transportation vehicle.

18. The transportation vehicle of claim 10, wherein a check is perform, before triggering automatic opening or closing the loading compartment door or the loading compartment flap of the transportation vehicle to determine whether a space required for opening or closing is free.

* * * * *